United States Patent
Lai

(10) Patent No.: US 11,201,514 B2
(45) Date of Patent: Dec. 14, 2021

(54) ROTOR WITH PRESSURE-DEVIATION GENERATING ASSEMBLY

(71) Applicant: TECO Electric & Machinery Co., Ltd., Taipei (TW)

(72) Inventor: Feng-Hsiang Lai, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 177 days.

(21) Appl. No.: 16/697,657

(22) Filed: Nov. 27, 2019

(65) Prior Publication Data
US 2020/0185992 A1     Jun. 11, 2020

(30) Foreign Application Priority Data

Dec. 5, 2018   (TW) .................................. 107143705

(51) Int. Cl.
*H02K 1/32* (2006.01)
*H02K 9/22* (2006.01)

(52) U.S. Cl.
CPC ................. *H02K 1/32* (2013.01); *H02K 9/22* (2013.01)

(58) Field of Classification Search
CPC .. H02K 1/32; H02K 9/22; H02K 9/08; H02K 1/325; H02K 9/02; H02K 9/04
USPC ..................................... 310/59, 61, 52, 60 R
See application file for complete search history.

(56) References Cited

U.S. PATENT DOCUMENTS

| 2,996,773 | A | * | 8/1961 | Summers | ........... B22D 19/0054 164/70.1 |
| 4,908,537 | A | * | 3/1990 | Sismour, Jr. | ............. H02K 1/32 310/215 |
| 5,907,208 | A | * | 5/1999 | Kristen | ..................... H02K 1/30 310/216.115 |
| 6,318,518 | B1 | * | 11/2001 | Shinohara | ............... F16D 65/78 188/264 AA |

(Continued)

FOREIGN PATENT DOCUMENTS

| DE | 102004047735 A1 | * | 4/2006 | ................ H02K 9/18 |
| DE | 102017205687 A1 | * | 10/2018 | ................ H02K 1/32 |

OTHER PUBLICATIONS

Holger (DE 102017205687 A1) English Translation (Year: 2018).*
Krieg (DE 102004047735 A1) English Translation (Year: 2006).*

*Primary Examiner* — Tulsidas C Patel
*Assistant Examiner* — Robert E Mates
(74) *Attorney, Agent, or Firm* — Muncy, Geissler, Olds & Lowe, P.C.

(57) ABSTRACT

A rotor with a pressure-deviation generating assembly includes a main body having a plurality of tunnels extending longitudinally, a first pressure-deviation generating assembly, and a second pressure-deviation generating assembly. The first pressure-deviation generating assembly generates a plurality of first high-pressure regions and first low-pressure regions. The second pressure-deviation generating assembly generates a plurality of second high-pressure regions and second low-pressure regions. At least one first flow flows through some of the tunnels from the first high-pressure regions to the second low-pressure regions, and at least one second flow flows through the rest of the tunnels from the second high-pressure regions to the first low-pressure regions. Thereupon, a bi-directional air flow pattern inside (Continued)

the tunnels can be built to promote the heat dissipation of the rotor.

18 Claims, 13 Drawing Sheets

(56) References Cited

U.S. PATENT DOCUMENTS

| | | | | |
|---|---|---|---|---|
| 6,472,782 | B1* | 10/2002 | Selci | B23Q 5/10 |
| | | | | 310/58 |
| 2016/0372985 | A1* | 12/2016 | Sailor | H02K 1/20 |
| 2018/0112675 | A1* | 4/2018 | Neff | B60H 1/00035 |

* cited by examiner

ROTOR WITH PRESSURE-DEVIATION GENERATING ASSEMBLY

This application claims the benefit of Taiwan Patent Application Serial No. 107143705, filed on Dec. 5, 2018, the subject matter of which is incorporated herein by reference.

BACKGROUND OF THE INVENTION

(1) Field of the Invention

The invention relates to a rotor, and more particularly to a rotor with a pressure-deviation generating assembly.

(2) Description of the Prior Art

Motor is a popular apparatus that can transform electric energy, to mechanical energy, and finally into kinetic energy through electromagnetic induction. Generally, the motor includes a motor frame, a rotor and a stator. During the transformation from the electric energy into the kinetic energy via the motor, currents would flow through coils of the stator so as to induce the magnetic effect. However, during the flow of the currents, inherent electric resistance of the coils would cause the generation of the corresponding thermal energy. If the thermal energy is excessively accumulated, even high to burn components of the motor, it is quite possible that the motor would be hard to operate normally. Thus, one of important issues for operating the motor is to find a relevant pathway for dissipating the excessive thermal energy generated inside the motor.

Refer to FIG. 1 and FIG. 2; where FIG. 1 is a schematic perspective view of a rotor of a conventional motor, and FIG. 2 demonstrates schematically a temperature profile (i.e., temperature distribution) of the rotor of FIG. 1 in operation. As shown, the conventional rotor PA1 includes a main body PA11 and a rotational shaft PA12.

The main body PA11, extending from a first end portion PAP1 to a second end portion PAP2 in an extension direction PAD, is furnished with a plurality of tunnels PA111 (only one labeled in the figure). Each of the tunnels PA111 is also extended from the first end portion PAP1 to the second end portion PAP2 in the extension direction PAD. In practical uses, the tunnels PA111 are generally distributed inside the main body PA11 in a circular manner. The rotational shaft PA12 is to penetrate through the main body PA11.

In order to reduce the temperature of the rotor PA1, a flow generator is usually introduced to the rotor PA1. Generally, the location and type of the flow generator (not shown in the figure) would determine the flow direction of the generated air flow. In the art, the flow generator can be an axial fan or a centrifugal fan, and can be disposed at the first end portion PAP1 or the second end portion PAP2.

If the flow generator is an axial fan and located at the first end portion PAP1, the flow generator would generate a plurality of flows from the first end portion PAP1 to the second end portion PAP2 through the tunnels PA111. On the other hand, if the flow generator is a centrifugal fan and located at the first end portion PAP1, the flow generator would generate a plurality of flows from the second end portion PAP2 to the first end portion PAP1 through the tunnels PA111. Similarly, if the flow generator is disposed at the second end portion PAP2, the air flow direction would be determined up to whether the flow generator is a centrifugal fan or an axial fan.

Nevertheless, whether the flow generator is a centrifugal fan or an axial fan, or located at the first end portion or the second end portion, the induced air flows inside the tunnels PA111 can only be in a unique direction. In other words, the entire flow may flow from the first end portion PAP1 to the second end portion PAP2, or from the second end portion PAP2 to the first end portion PAP1. It is never possible that a portion of the flows flow from the first end portion PAP1 to second end portion PAP2, while another portion of the flows flow from the second end portion PAP2 to the first end portion PAP1.

As shown in FIG. 2, a typical temperature profile (including a plurality of temperature levels) for the rotor PA1 in operation is provided. It shall be explained that the temperature level is a concept of temperature interval. Each of the temperature levels includes a corresponding practical temperature interval. A high temperature level implies that the corresponding temperature interval is within a high-temperature range. For example, the temperature level 1 is referring to the temperature interval from 11° C. to 20° C., the temperature level 2 is referring to the temperature interval from 21° C. to 30° C., and so forth.

As shown in FIG. 2, the temperature level 10 of the rotor PA1, the highest temperature level, is at the central area of the main body PA11, and occupies almost ⅓ of the main body PA11. The temperature levels are gradually lowered from the temperature level 10 toward the first end portion PAP1 or the second end portion PAP2. Namely, temperature distribution of the rotor PA1 is descending in temperature from the central portion to any of the opposite ends. If the air flow flows from the first end portion PAP1 to the second end portion PAP2, the air flow would absorb the thermal energy all the way through the tunnels PA111. Thereupon, the temperature of the air flow would go higher as it gets closer to the second end portion PAP2. Similarly, if the air flow flows from the second end portion PAP2 to the first end portion PAP1, then the air flow would reach the highest temperature as it arrives at the first end portion PAP1. In other words, if the entire air flow is unidirectional, the highest temperature would occur at the end of the air flow.

In addition, if the air flow needs to be circulated back to the air inlet, flow pathways need to be furnished to the motor frame or the stator, such that the air flow can be circulated back to the air inlet from the air outlet via the flow pathway. However, engineering difficulty would occur while in constructing the flow pathways at the motor frame or the stator. Thereupon, production costs would be raised to certain degree, and more seriously construction of the flow pathways will interfere that of the heat-dissipation fins. Trade-off between the numbers of the heat-dissipation fins and the flow pathways at the motor frame would definitely sacrifice heat-dissipation performance of the entire motor.

SUMMARY OF THE INVENTION

In view that, in the prior art, various shortcomings arise due to the unidirectional air flow, accordingly, it is an object of the present invention to provide a rotor with a pressure generating assembly for forming a pressure deviation and for inducing air flows at different directions.

In this invention, the rotor with a pressure-deviation generating assembly includes a main body, a first pressure-deviation generating assembly and a second pressure-deviation generating assembly.

The main body, extending from a first end portion to a second end portion, is furnished with a plurality of tunnels extending from the first end portion to the second end portion. The first end portion has a first interior wall, and the second end portion has a second interior wall.

The first pressure-deviation generating assembly, coupled with the first interior wall of the main body, includes a plurality of first pressure-deviation generating fins positioned in correspondence to the plurality of tunnels at the first end portion. Each of the plurality of first pressure-deviation generating fins extends from the first interior wall toward a rotor shaft. When the main body rotates, a first high-pressure region higher in pressure than a normal-pressure region is generated at a first pressure-increased side of each of the plurality of first pressure-deviation generating fins, and a first low-pressure region lower in pressure than the normal-pressure region is generated at a first pressure-reduced side of each of the plurality of first pressure-deviation generating fins.

The second pressure-deviation generating assembly, coupled with the second interior wall of the main body, includes a plurality of second pressure-deviation generating fins positioned in correspondence to the plurality of tunnels at the second end portion. Each of the plurality of second pressure-deviation generating fins extends from the second interior wall toward the rotor shaft. When the main body rotates, a second high-pressure region higher in pressure than the normal-pressure region is generated at a second pressure-increased side of each of the plurality of second pressure-deviation generating fins and located respective to the first low-pressure region, and a second low-pressure region lower in pressure than the normal-pressure region is generated at a second pressure-reduced side of each of the plurality of second pressure-deviation generating fins and located respective to the first high-pressure region.

In the present invention, the first high-pressure region and the second low-pressure region are disposed in correspondence to at least one first tunnel out of the plurality of tunnels, and the first low-pressure region and the second high-pressure region are disposed in correspondence to at least one second tunnel out of the plurality of tunnels, such that at least one first flow is generated to flow from the first high-pressure region to the second low-pressure region via the at least one first tunnel, and at least one second flow is generated to flow from the second high-pressure region to the first low-pressure region via the at least one second tunnel.

In one embodiment of the present invention, the first pressure-deviation generating assembly and the main body are integrated as a unique piece.

In one embodiment of the present invention, the first pressure-deviation generating assembly is fixed to the main body by at least one fastener.

In one embodiment of the present invention, the first pressure-deviation generating assembly is fixed to the main body by at least one buckling structure.

In one embodiment of the present invention, a number of the plurality of tunnels is equal to twice a number of the plurality of first pressure-deviation generating fins.

In one embodiment of the present invention, the plurality of tunnels is arranged in a circular form with an identical interval, and the plurality of first pressure-deviation generating fins is arranged respective to the plurality of tunnels with another identical interval.

In one embodiment of the present invention, the plurality of second pressure-deviation generating fin is arranged at the second end portion in a misalignment manner respective to the plurality of first pressure-deviation generating fins.

In one embodiment of the present invention, the plurality of second pressure-deviation generating fins is arranged with a further identical interval.

In one embodiment of the present invention, a number of the plurality of second pressure-deviation generating fins is equal to that of the plurality of first pressure-deviation generating fins.

In one embodiment of the present invention, the first pressure-deviation generating assembly further includes a first end ring, and one side of the first end ring is coupled with the first interior wall of the main body, while another side thereof is coupled with the plurality of first pressure-deviation generating fins.

In one embodiment of the present invention, the second pressure-deviation generating assembly further includes a second end ring, and one side of the second end ring is coupled with the second interior wall of the main body, while another side thereof is coupled with the plurality of second pressure-deviation generating fins.

In one embodiment of the present invention, each of the plurality of first pressure-deviation generating fins extends from the first interior wall toward the rotor shaft by a first extension length, each of the plurality of tunnels has an aperture size, and the first extension length is larger than the aperture size.

In one embodiment of the present invention, each of the plurality of second pressure-deviation generating fins extends from the second interior wall toward the rotor shaft by a second extension length larger than the aperture size.

In one embodiment of the present invention, the second extension length is equal to the first extension length.

In another aspect of the present invention, a rotor with a pressure-deviation generating assembly includes a main body and a first pressure-deviation generating assembly.

The main body, extending from a first end portion to a second end portion, is furnished with a plurality of tunnels extending from the first end portion to the second end portion. The first end portion has a first interior wall. The first pressure-deviation generating assembly, coupled with the first interior wall of the main body, includes a plurality of first pressure-deviation generating fins positioned in correspondence to the plurality of tunnels at the first end portion. Each of the plurality of first pressure-deviation generating fins extends from the first interior wall toward a rotor shaft. When the main body rotates, a first high-pressure region higher in pressure than a normal-pressure region is generated at a first pressure-increased side of each of the plurality of first pressure-deviation generating fins, and a first low-pressure region lower in pressure than the normal-pressure region is generated at a first pressure-reduced side of each of the plurality of first pressure-deviation generating fins.

In this aspect of the present invention, the first high-pressure region is disposed in correspondence to at least one first tunnel out of the plurality of tunnels, and the first low-pressure region is disposed in correspondence to at least one second tunnel out of the plurality of tunnels, such that at least one first flow is generated to flow from the first high-pressure region to the second end portion via the at least one first tunnel, and at least one second flow is generated to flow from the second end portion to the first low-pressure region via the at least one second tunnel.

In one embodiment of the present invention, the first pressure-deviation generating assembly and the main body are integrated as a unique piece.

In one embodiment of the present invention, the first pressure-deviation generating assembly is fixed to the main body by at least one fastener.

In one embodiment of the present invention, the first pressure-deviation generating assembly is fixed to the main body by at least one buckling structure.

In one embodiment of the present invention, a number of the plurality of tunnels is equal to twice a number of the plurality of first pressure-deviation generating fins.

In one embodiment of the present invention, the plurality of tunnels is arranged in a circular form with an identical interval, the plurality of first pressure-deviation generating fins is arranged respective to the plurality of tunnels with another identical interval.

In one embodiment of the present invention, the plurality of tunnels is arranged in a circular form with an identical interval, the plurality of first pressure-deviation generating fins is arranged respective to the plurality of tunnels with another identical interval.

In one embodiment of the present invention, each of the plurality of first pressure-deviation generating fins extends from the first interior wall toward the rotor shaft by a first extension length, each of the plurality of tunnels has an aperture size, and the first extension length is larger than the aperture size.

As stated, the rotor with a pressure-deviation generating assembly provided by the present invention can generate a pressure deviation between the first end portion and the second end portion, and thus a bi-directional air flow pattern inside the tunnels can be built to promote the heat dissipation of the rotor.

All these objects are achieved by the rotor with a pressure-deviation generating assembly described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a rotor with a pressure-deviation generating assembly. In the following description, numerous details are set forth in order to provide a thorough understanding of the present invention. It will be appreciated by one skilled in the art that variations of these specific details are possible while still achieving the results of the present invention. In other instance, commonly known components are not described in detail in order not to unnecessarily obscure the present invention.

Figure 3:
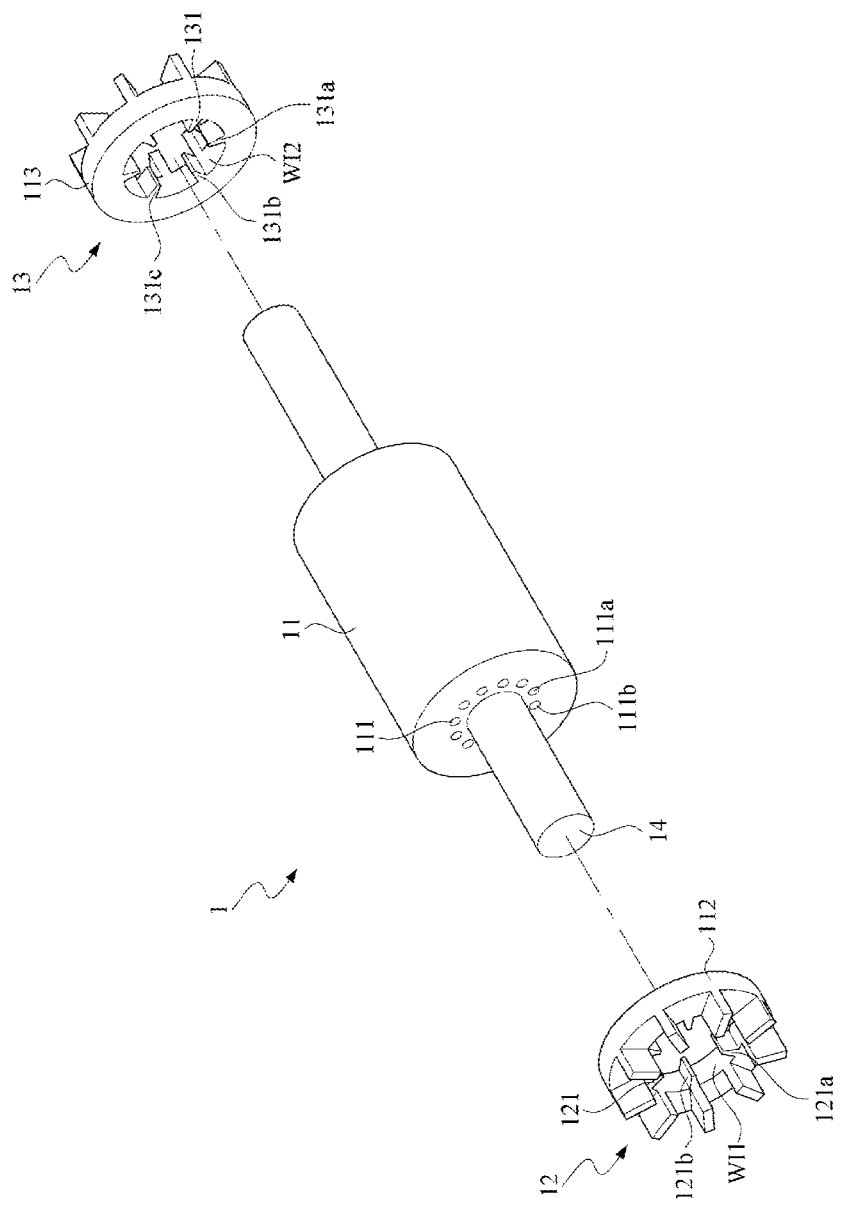
FIG. 3 is a schematic exploded view of a first embodiment of the rotor with a pressure-deviation generating assembly in accordance with the present invention.
Figure 4:
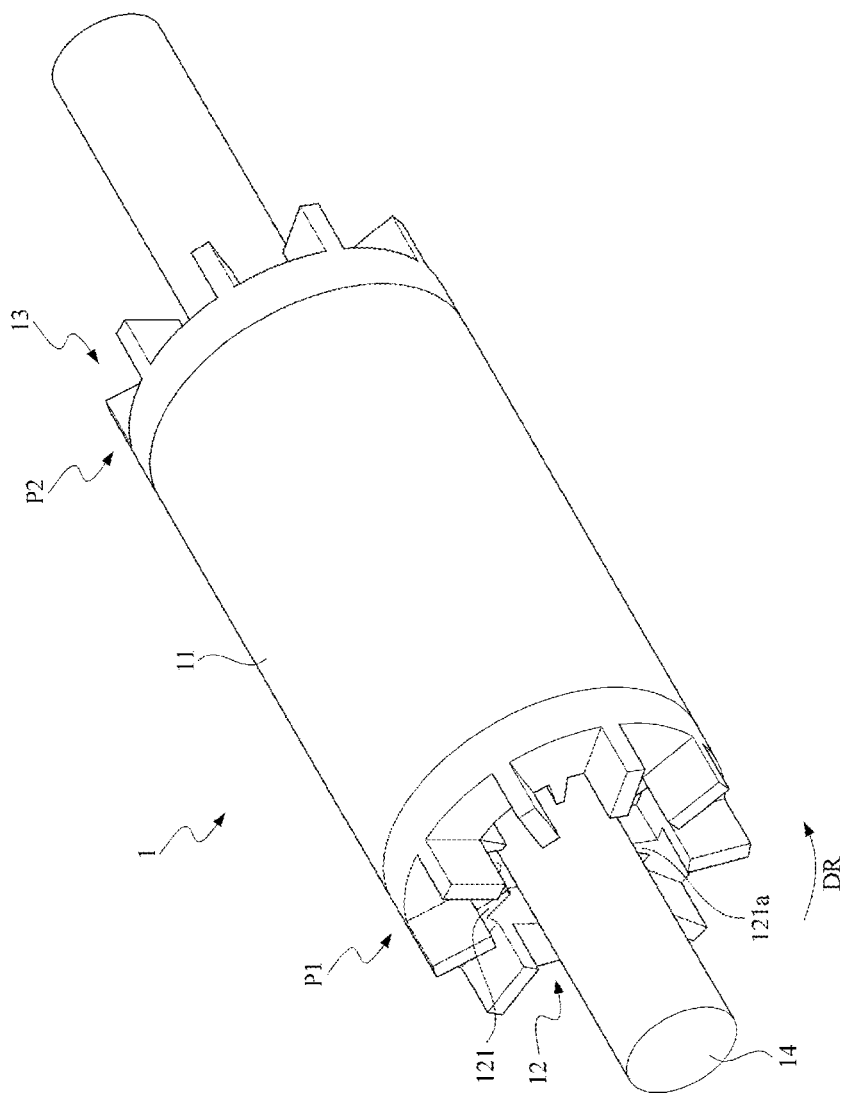
FIG. 4 is a schematic perspective view of FIG. 3.
Figure 5:
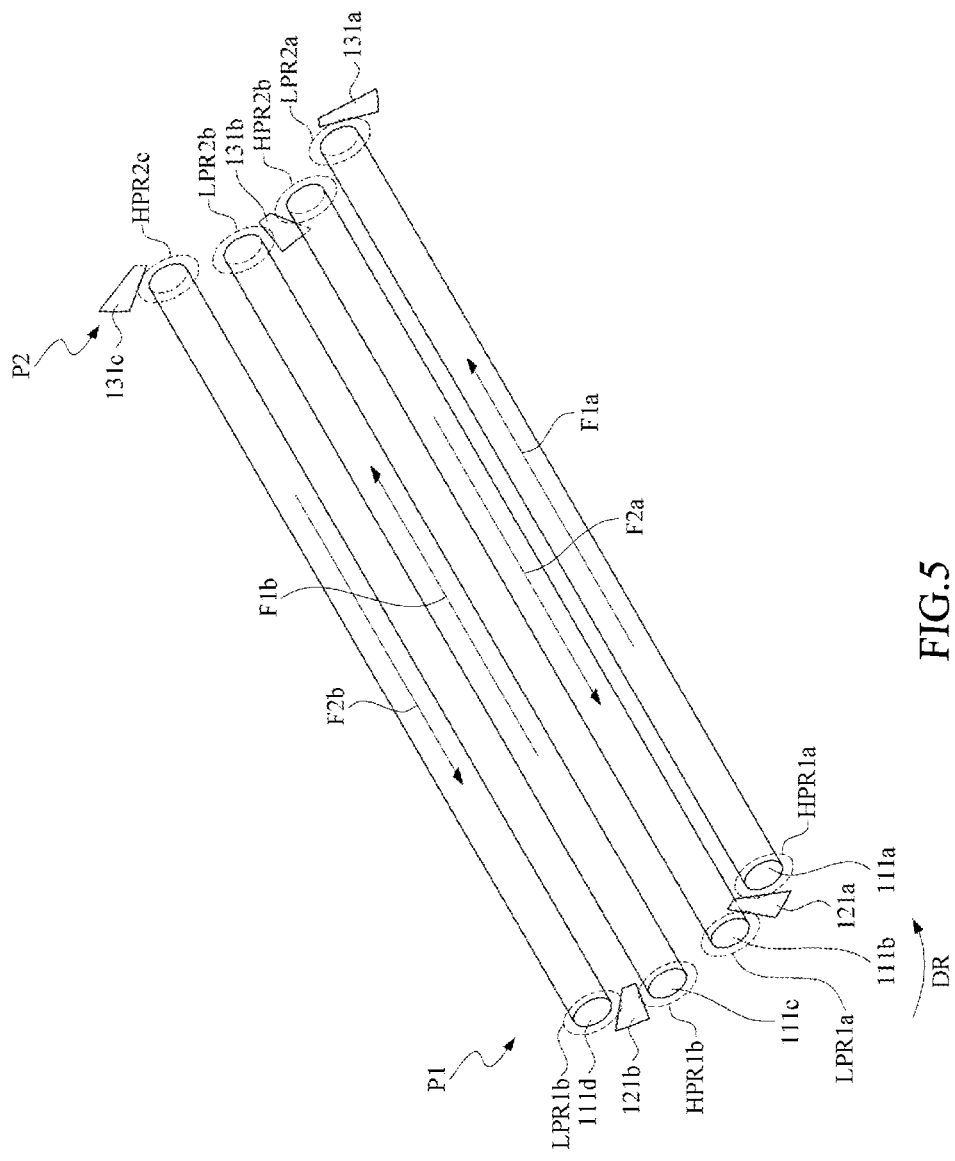
FIG. 5 demonstrates schematically a flow pattern provided by the first embodiment of the rotor with a pressure-deviation generating assembly in accordance with the present invention.
Figure 6:
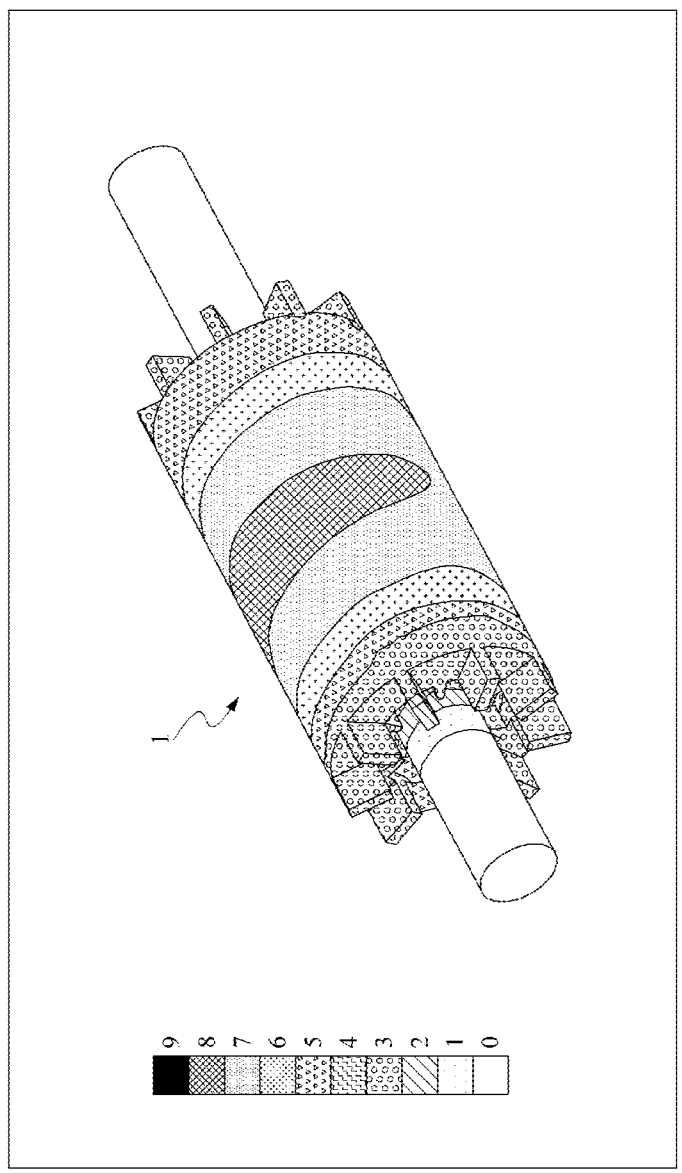
FIG. 6 demonstrates schematically a temperature profile of the rotor of FIG. 4 at work.

Refer to FIG. 3 through FIG. 6; where FIG. 3 is a schematic exploded view of a first embodiment of the rotor with a pressure-deviation generating assembly in accordance with the present invention, FIG. 4 is a schematic perspective view of FIG. 3, FIG. 5 demonstrates schematically a flow pattern provided by the rotor of FIG. 4, and FIG. 6 demonstrates schematically a temperature profile of the rotor of FIG. 4 at work. As shown, the rotor with a pressure-deviation generating assembly 1 includes a main body 11, a first pressure-deviation generating assembly 12, a second pressure-deviation generating assembly 13 and a rotor shaft 14.

The main body 11, extending from a first end portion P1 to a second end portion P2, is furnished with a plurality of tunnels 111 extending in parallel from the first end portion P1 to the second end portion P2. The first end portion P1 has a first interior wall WI and the second end portion P2 has a second interior wall WI2. Further, the main body 11 includes a first main end ring 112 disposed at the first end portion P1 and a second main end ring 113 disposed at the second end portion P2. The first main end ring 112 and the second main end ring 113 are individually provided with the first interior wall WI1 and the second interior wall WI2, respectively. The tunnels 111 are arranged in a circular manner, and spaced by the same interval. However, in some other embodiments of the present invention, the tunnels can be separately arranged by different intervals.

Practically, the first main end ring 112 and the second main end ring 113 are integrated with the main body 11 as a unique piece. In the drawings, the major reason for these three parts 11, 112, 113 to be separately expressed is only because the tunnels 111, the first pressure-deviation generating assembly 12, the second pressure-deviation generating assembly 13, the first interior wall WI1 and the second interior wall WI2 can be thus clearly demonstrated.

The first pressure-deviation generating assembly 12, furnished with the first interior wall WI1 of the main body 11, includes a plurality of first pressure-deviation generating fins. It shall be explained that, in the following description, labels 121a and 121b for the first pressure-deviation generating fins in the figure are only used for conveniently elucidating this embodiment, and label 121 is the general part number for every of the first pressure-deviation generating fins in the description of this disclosure. The first pressure-deviation generating fin 121, disposed at the first end portion P1 by corresponding to the tunnel 111, protrudes from the first interior wall WI1 toward the rotor shaft 14. The second pressure-deviation generating assembly 13, furnished with the second interior wall WI2 of the main body 11, includes a plurality of second pressure-deviation generating fins. It shall be explained that, in the following description, labels 131a and 131b for the second pressure-deviation generating fins in the figure are only used for conveniently elucidating this embodiment, and label 131 is the general part number for every of the second pressure-deviation generating fins in the description of this disclosure. The second pressure-deviation generating fin 131, disposed at the second end portion P2 by corresponding to the tunnel 111, protrudes from the second interior wall WI2 toward the rotor shaft 14.

In this embodiment, the first pressure-deviation generating assembly 12 and the second pressure-deviation generating assembly 13 are integrated with the first interior wall WI1 and the second interior wall WI2, respectively, as a unique piece. The number of the tunnels 111 is twice the number of the first pressure-deviation generating fin 121. The first pressure-deviation generating fins 121 are arranged by the same interval. On the other hand, the second pressure-deviation generating fins 131 are connected with the second interior wall WI2 by a rotational dislocation with respect to the corresponding first pressure-deviation generating fins 121, and the second pressure-deviation generating fins 131 are arranged by, but not limited to, the same interval. In some other embodiments of the present invention, the number of the tunnels 111 can be triple, four times, five times or the like integer multiple the number of the first pressure-deviation generating fins. Definitely, according to this disclosure, the multiple can be 1.5, 2.5, 3.5 or the like. In addition, any of two neighboring first or second pressure-deviation generating fins can be assigned with different interval.

While the main body 11 rotates in a direction of rotation DR, a first high-pressure region with a pressure higher than that of a normal-pressure region is formed at a first pressure-increased side of each the first pressure-deviation generating fin 121, and a first low-pressure region with a pressure lower than that of a normal-pressure region is formed at a first pressure-reduced side of each the first pressure-deviation generating fin 121. Simultaneously, a second high-pressure region with a pressure higher than that of a normal-pressure region is formed at a second pressure-increased side of each the second pressure-deviation generating fin 131 and located in correspondence to the first low-pressure region, and a second low-pressure region with a pressure lower than that of a normal-pressure region is formed at a second pressure-reduced side of each the second pressure-deviation generating fin 121 and located in correspondence to the first high-pressure region. The aforesaid normal-pressure region is the pressure state while the main body 11 is stationary, labeled as an NPRe in FIG. 13.

Further, referring to FIG. 3 and FIG. 5, as the main body 11 rotates in the direction of rotation DR, the first pressure-deviation generating fin 121a would induce the first high-pressure region HPR1a and a first low-pressure region LPR1a, both of which are compared in pressure with the normal-pressure region NPRe. Similarly, the first pressure-deviation generating fin 121b forms the first high-pressure region HPR1b and the first low-pressure region LPR1b. Simultaneously, the second pressure-deviation generating fin 131a induces the second low-pressure region LPR2a, the second pressure-deviation generating fin 131b induces the second high-pressure region HPR2b and the second low-pressure region LPR2b, and the second pressure-deviation generating fin 131c induces the second high-pressure region HPR2c. It is noted that the second high-pressure region generated by the second pressure-deviation generating fin 131a and the second low-pressure region generated by the second pressure-deviation generating fin 131c are not shown in the figure.

The first high-pressure region and the second low-pressure region are positioned in correspondence to each other with respect to at least one first tunnel of the tunnels 111. For example, the first high-pressure region HPR1a is located at a position corresponding to the second low-pressure region LPR2a with respect to the first tunnel 111a, and the first high-pressure region HPR1b is located at a position corresponding to the second low-pressure region LPR2b with respect to the first tunnel 111c. The first low-pressure region and the second high-pressure region are positioned in correspondence to each other with respect to at least one second tunnel of the tunnels 111. For example, the first low-pressure region LPR1a is located at a position corresponding to the second high-pressure region HPR2b with respect to the second tunnel 111b, and the first low-pressure region LPR1b is located corresponding to the second high-pressure region HPR2c with respect to the second tunnel 111d.

Since an air flow flows automatically from a high-pressure region to a low-pressure region, thus the first high-pressure regions HPR1a and HPR1b would initiate individual first flows F1a and F1b to flow through the corresponding first tunnels 111a and 111c and then reach the corresponding second low-pressure regions LPR2a and LPR2b, and the second high-pressure regions HPR2b and HPR2c would also initiate individual second flows F2a and F2b to flow through the corresponding second tunnels 111b and 111d and then reach the first low-pressure regions LPR1a and LPR1b. Similarly, all other tunnels 111 play roles to flow corresponding air flows. In this embodiment, tunnels 111 can be divided into the first tunnels and the second tunnels, in which the first tunnels and the second tunnels have the same number. Namely, in all tunnels 111, a half number of the tunnels 111 would flow thereinside individual air flows from the first end portion P1 to the second end portion P2, while another half number of the tunnels 111 flow thereinside individual air flows from the second end portion P2 to the first end portion P1. Thereupon, a bidirectional air flow pattern for the rotor can be achieved.

Figure 1:
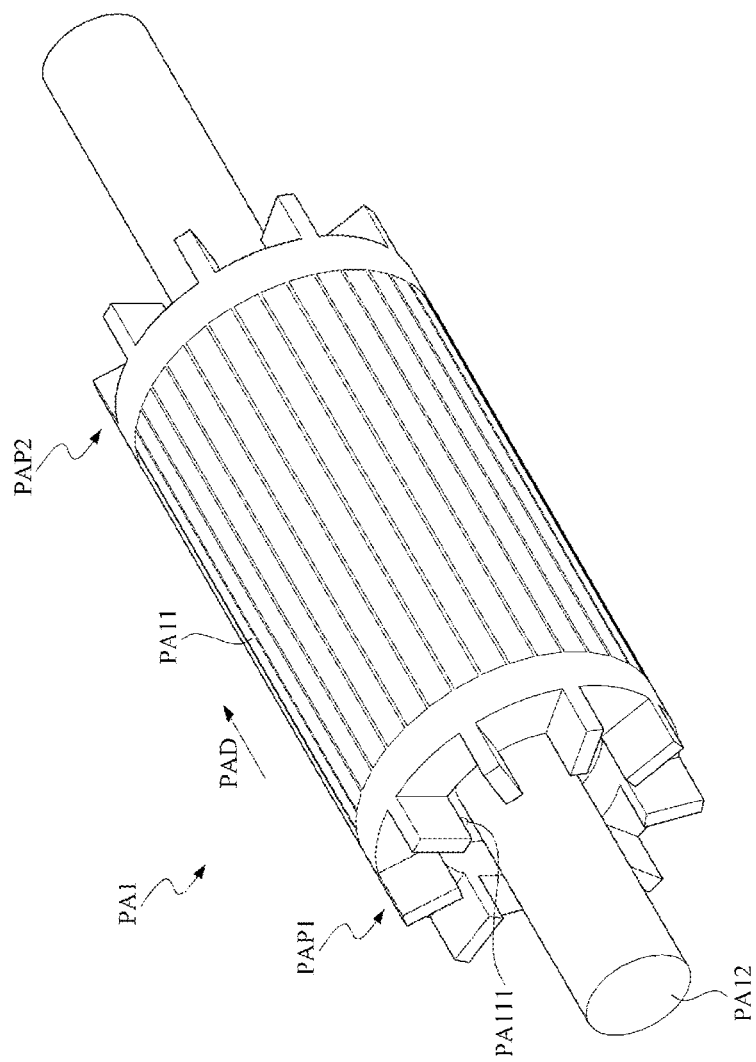
FIG. 1 is a schematic perspective view of a rotor of a conventional motor.
Figure 2:
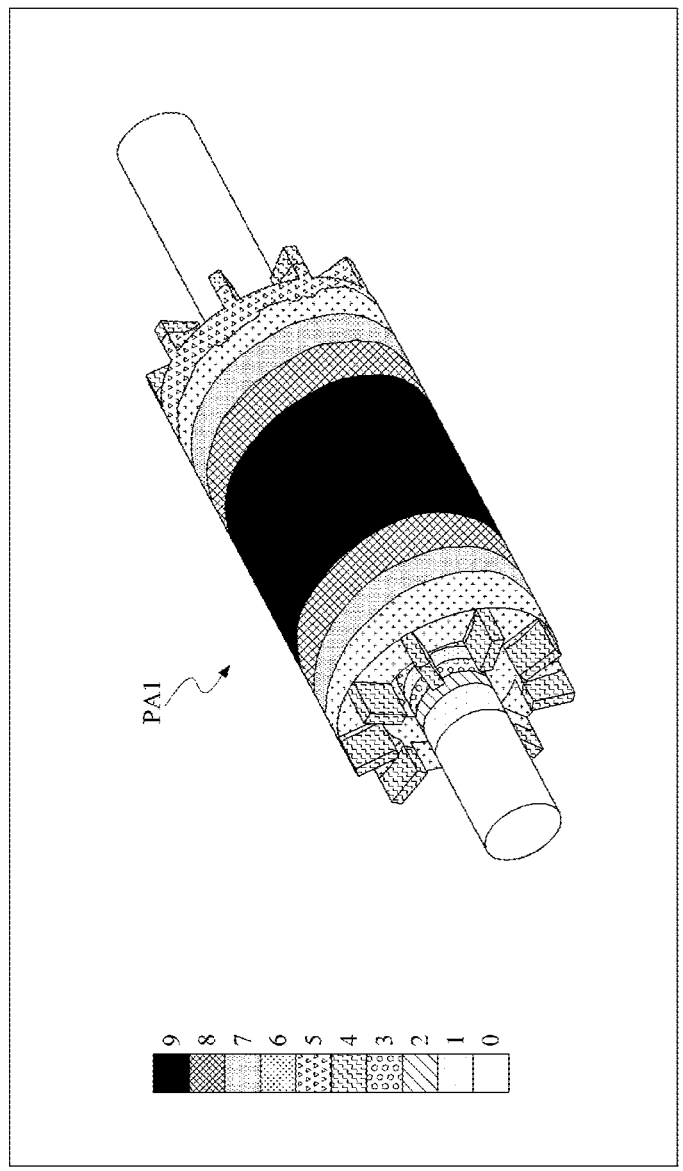
FIG. 2 demonstrates schematically a temperature profile of the rotor of FIG. 1 at work.

Then, as shown in FIG. 6 with a reference to FIG. 2, by providing the first pressure-deviation generating fins 121 and the second pressure-deviation generating fins 131 to form respective position relationships, the air flow along the individual tunnel 111 is not unidirectional anymore. In other words, the air flow inside the individual tunnel 111 may be a first flow from the first end portion P1 to the second end portion P2 (for example, F1a and F1b in FIG. 5), or a second flow from the second end portion P2 to the first end portion P1 (for example, F2a and F2b in FIG. 5). Under such an arrangement, the bidirectional air flow pattern can be thus obtained, so that the temperature of the rotor with a pressure-deviation generating assembly 1 can be substantially reduced. By comparing FIG. 6 and FIG. 2, it is obvious that the rotor 1 with the pressure-deviation generating assembly provided by this disclosure can provide a much more satisfied temperature profile than the conventional rotor PA1 can. In particular, the highest temperature level 9 does not appear in FIG. 6, and thus the rotor 1 with a pressure-deviation generating assembly is proved able to boost the heat-dissipation performance by reducing the overall temperature distribution over the entire rotor.

Each of the first pressure-deviation generating fins 121 protrudes from the first interior wall WI1 toward the rotor shaft 14 by a first extension length (not shown in the figure), each of the tunnels 111 has an aperture size (not shown in this figure), and each of the second pressure-deviation generating fins 131 also protrudes from the second interior wall WI2 toward the rotor shaft 14 by a second extension length (not shown in the figure). Preferably, the first extension length is greater than the aperture size, and the second extension length is greater than the aperture size. However, according to this disclosure, the first extension length or the second extension length can be equal to the aperture size. More preferably, the first extension length is equal to the second extension length.

In some other embodiments of the present invention, in the case that the number of the tunnels is triple, four times, five times or the other integer multiple of the number of the first pressure-deviation generating fins, each pair of the first high-pressure region and the second low-pressure region would be responsible for a plurality of the first tunnels, and each pair of the second high-pressure region and the first low-pressure region would be corresponding to a plurality of the second tunnels. Nevertheless, in the case that the number of the tunnels is 1.5, 2.5, 3.5 or the like multiple of the number of the first pressure-deviation generating fins, each pair of the first high-pressure region and the second low-pressure region would account for at least one first tunnel, and each pair of the second high-pressure region and the first low-pressure region would account for at least one second tunnels. In any of the aforementioned embodiments, a pressure deviation would be induced between two opposing ends of the tunnel, but this pressure deviation would be smaller than that able to be provided by the aforesaid first embodiment. It is well known that any existence of the pressure deviation would induce automatically a corresponding air flow. Thus, the object of the bidirectional air flow pattern can be obtained, even though the induced air flow may be weaker than that in the first embodiment. Namely, the performance in heat dissipation provided by these embodiments is still superior to that provided by the conventional technique.

Figure 7:
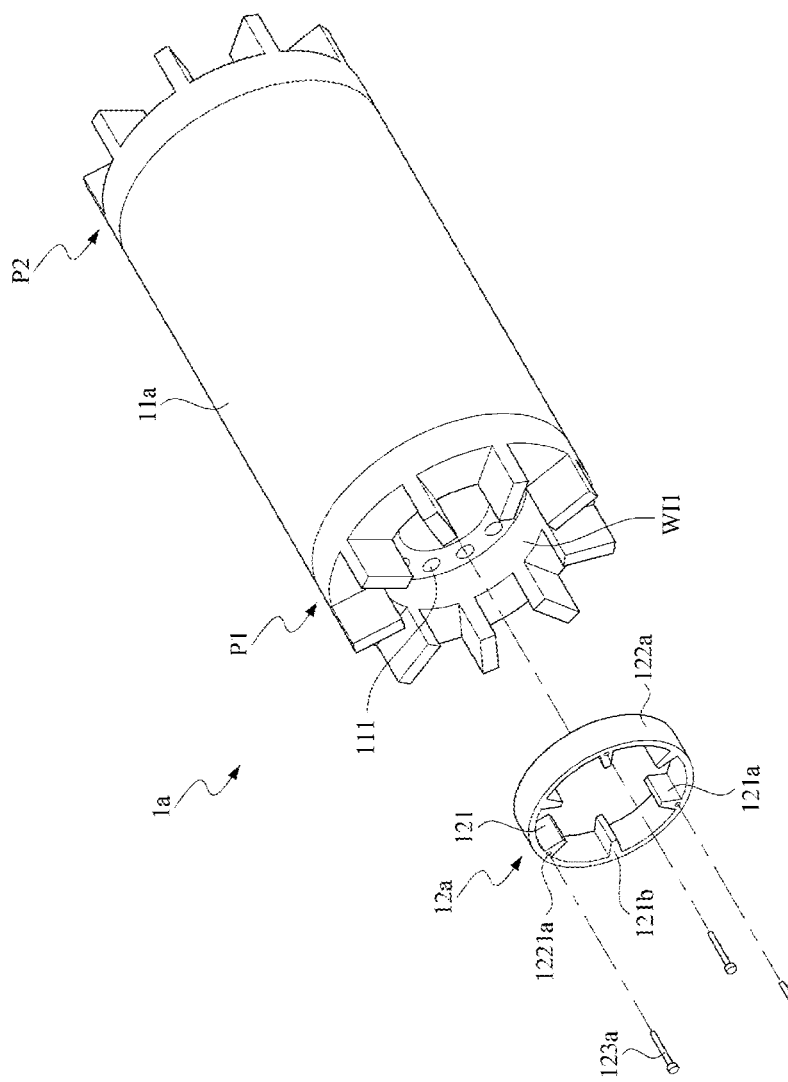
FIG. 7 is a schematic exploded view of a second embodiment of the rotor with a pressure-deviation generating assembly in accordance with the present invention.

Refer now to FIG. 3 and FIG. 7, where FIG. 7 is a schematic exploded view of a second embodiment of the rotor with a pressure-deviation generating assembly in accordance with the present invention. As shown, in this embodiment, the rotor with a pressure-deviation generating assembly 1a includes a main body 11a, a first pressure-deviation generating assembly 12a and a second pressure-deviation generating assembly. In comparison with the first embodiment, the main body 11a of this embodiment further includes locking holes (though not shown in the figure).

The major deviation between this second embodiment and the first embodiment is at the first pressure-deviation generating assembly 12a and the second pressure-deviation generating assembly. In this embodiment, the first pressure-deviation generating assembly 12a includes a plurality of first pressure-deviation generating fins 121, 121a and 121b, and a first end ring 122a furnished with at least one end ring-locating hole 1221a. The first pressure-deviation generating assembly 12a introduces at least one fastener 123a to penetrate through the corresponding end ring-locating hole 1221a, so that the first pressure-deviation generating assembly 12a can be locked to the main body 11a, with one side (outer surface) of the first end ring 122a to contact the first interior wall WI1, while another side (inner surface) thereof is connected with the first pressure-deviation generating fins (121, 121a and 121b for example). The second pressure-deviation generating assembly (not shown due to the viewing angle) is structurally and functionally the same as the first pressure-deviation generating assembly 12a, and thus details thereabout would be omitted herein. However, it shall be explained that the second pressure-deviation generating fins of the second pressure-deviation generating assembly are shifted to form a misalignment with respect to the corresponding first pressure-deviation generating fins of the first pressure-deviation generating assembly 12a; i.e., similar to the arrangement of the first embodiment.

Figure 8:
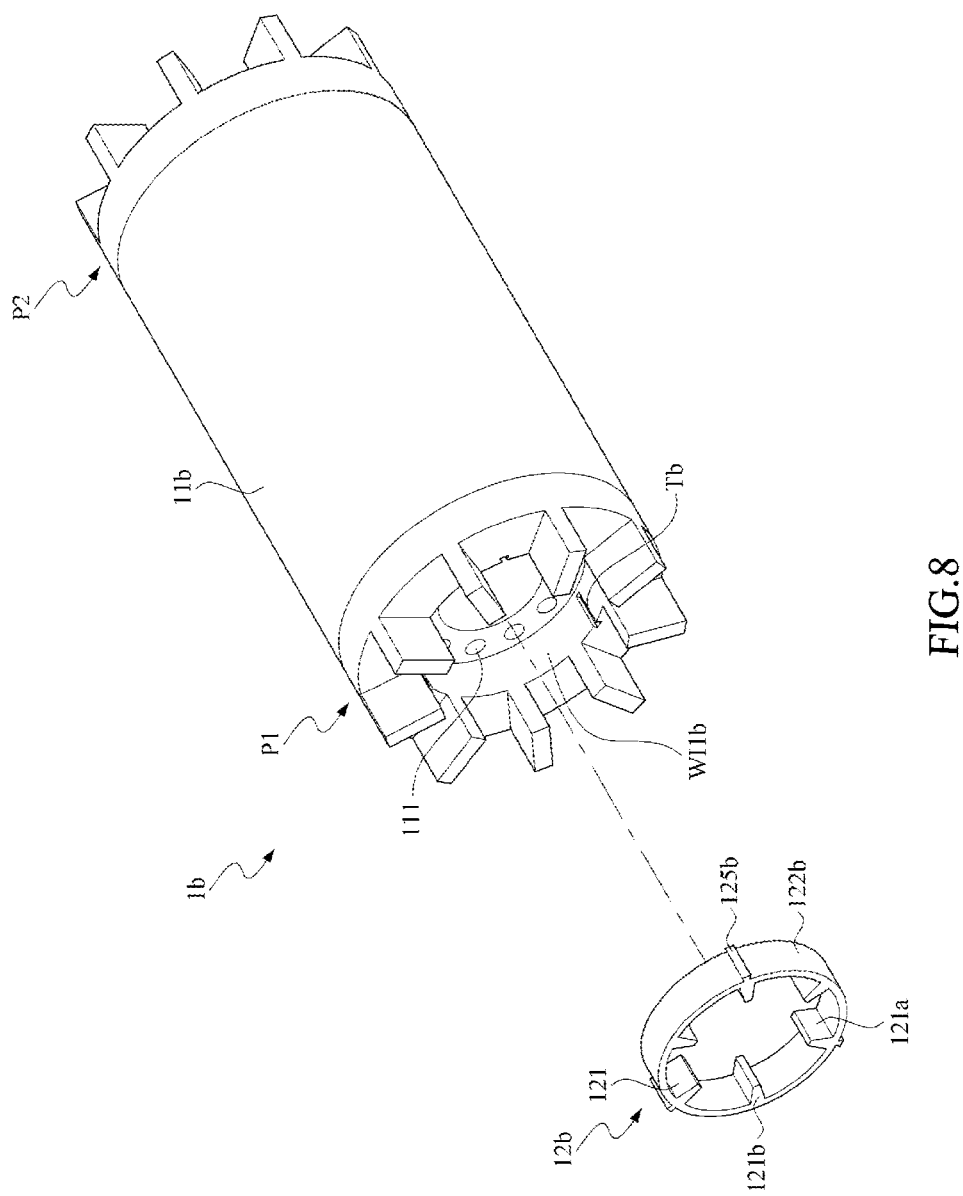
FIG. 8 is a schematic exploded view of a third embodiment of the rotor with a pressure-deviation generating assembly in accordance with the present invention.

Refer now to FIG. 3 and FIG. 8, where FIG. 8 is a schematic exploded view of a third embodiment of the rotor with a pressure-deviation generating assembly in accordance with the present invention. As shown, the rotor with a pressure-deviation generating assembly 1b includes a main body 11b, a first pressure-deviation generating assembly 12b and a second pressure-deviation generating assembly. A deviation between the main body 11b and that of the first embodiment is that, in this embodiment, the first interior wall WI1b is furnished with at least one buckling groove Tb.

Similar to the second embodiment, the major deviation between this third embodiment and the first embodiment is at the first pressure-deviation generating assembly 12b and the second pressure-deviation generating assembly. In this embodiment, the first pressure-deviation generating assembly 12b includes a plurality of first pressure-deviation generating fins 121, 121a and 121b, a first end ring 122b, and at least one buckling structure 125b. In particular, a bottom end of the buckling structure 125b at the first end ring 122b is narrower than a top end thereof away from the first end ring 122b.

The first pressure-deviation generating assembly 12b utilizes the buckling structures 125b to connect fixedly the main body 11b in a buckling manner with the corresponding buckling grooves Tb, such that the outer side of the first end ring 122b can connect the first interior wall WI1b, while the inner side thereof connects the first pressure-deviation generating fins 121, 121a and 121b. The second pressure-deviation generating assembly (not shown due to the viewing angle) is structurally and functionally the same as the first pressure-deviation generating assembly 12b, and thus details thereabout would be omitted herein. However, it shall be explained that the second pressure-deviation generating fins of the second pressure-deviation generating assembly are shifted to form a misalignment with respect to the corresponding first pressure-deviation generating fins of the first pressure-deviation generating assembly 12b; i.e., similar to the arrangement of the first embodiment.

Figure 9:
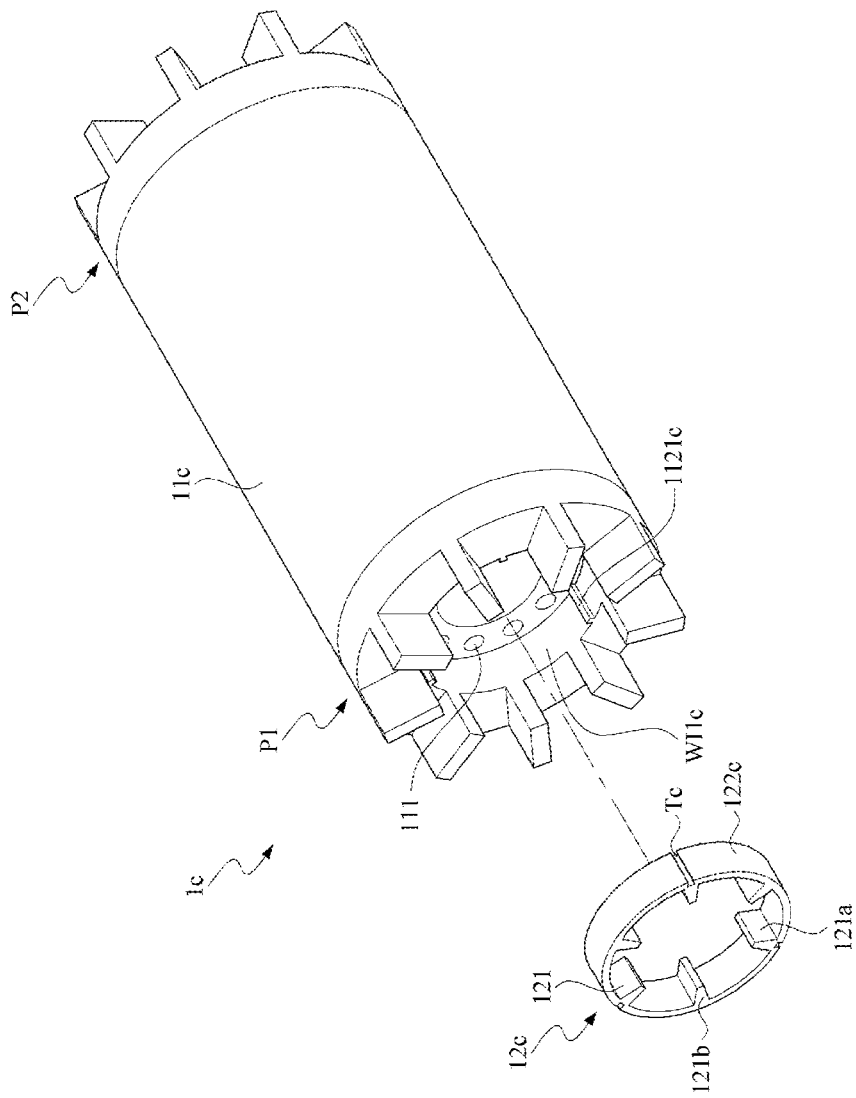
FIG. 9 is a schematic exploded view of a fourth embodiment of the rotor with a pressure-deviation generating assembly in accordance with the present invention.

Refer now to FIG. 3 and FIG. 9, where FIG. 9 is a schematic exploded view of a fourth embodiment of the rotor with a pressure-deviation generating assembly in accordance with the present invention. As shown, the rotor with a pressure-deviation generating assembly 1c includes a main body 11c, a first pressure-deviation generating assembly 12c and a second pressure-deviation generating assembly. A difference between the main body 11c and that of the first embodiment is that, in this embodiment, the first interior wall WI1c is furnished with at least one buckling structure 1121c. In particular, an end of the buckling structure 1121c at the first interior wall WI1c is wider than another end thereof away from the first interior wall WI1c.

Similar to the two foregoing embodiments, the major difference between this fourth embodiment and the first embodiment is at the first pressure-deviation generating assembly 12c and the second pressure-deviation generating assembly. In this embodiment, the first pressure-deviation generating assembly 12c includes a plurality of first pressure-deviation generating fins 121, 121a and 121b and a first end ring 122c. The first end ring 122c is further furnished with at least one buckling groove Tc located and shaped in correspondence to the buckling structure 1121c.

The first pressure-deviation generating assembly 12c utilizes the buckling groove Tc to connect fixedly the main body 11b in a buckling manner with the corresponding buckling structure 1121c, such that the outer side of the first end ring 122c can connect the first interior wall WI1c, while the inner side thereof connects the first pressure-deviation generating fins 121, 121a and 121b. The second pressure-deviation generating assembly (not shown due to the viewing angle) is structurally and functionally the same as the first pressure-deviation generating assembly 12c, and thus details thereabout would be omitted herein. However, it shall be explained that the second pressure-deviation generating fins of the second pressure-deviation generating assembly are shifted to form a misalignment with respect to the corresponding first pressure-deviation generating fins of the first pressure-deviation generating assembly 12c; i.e., similar to the arrangement of the first embodiment.

Figure 10:
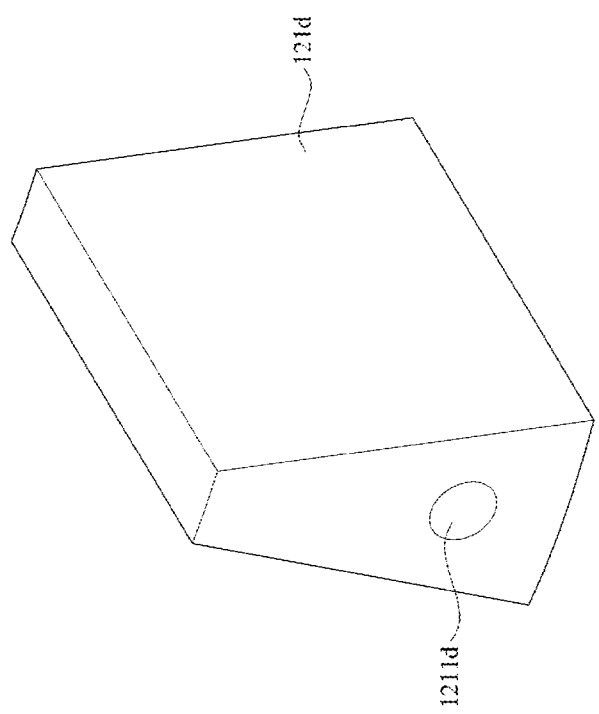
FIG. 10 is a schematic perspective view of a first pressure-deviation generating fin of a first pressure-deviation generating assembly for a fifth embodiment of the rotor with a pressure-deviation generating assembly in accordance with the present invention.

Then, refer now to FIG. 1, and FIG. 7 through FIG. 10 together, where FIG. 10 is a schematic perspective view of a first pressure-deviation generating fin of a first pressure-deviation generating assembly for a fifth embodiment of the rotor with a pressure-deviation generating assembly in accordance with the present invention.

The major difference between the first embodiment and this embodiment is at the first pressure-deviation generating fin 121d of the first pressure-deviation generating assembly. In the first embodiment, the first pressure-deviation generating assembly 12 is integrated with the main body 11 as a unique piece. However, in this embodiment, each of the first pressure-deviation generating fins 121d is furnished with a fin-locating hole 1211d. The first pressure-deviation generating fin 121d can be locked to the main body (similar to the element 11a in FIG. 7) by, but not limited to, a fastener (similar to the element 123a in FIG. 7). In some other embodiments of the present invention, the first pressure-deviation generating fin can be also furnished with a buckling structure (similar to the element 125b in FIG. 8) or a buckling groove (similar to the element Tc in FIG. 9) for buckling fixedly with the main body (similar to the element 11b in FIG. 8 and the element 11c in FIG. 9).

Figure 11:
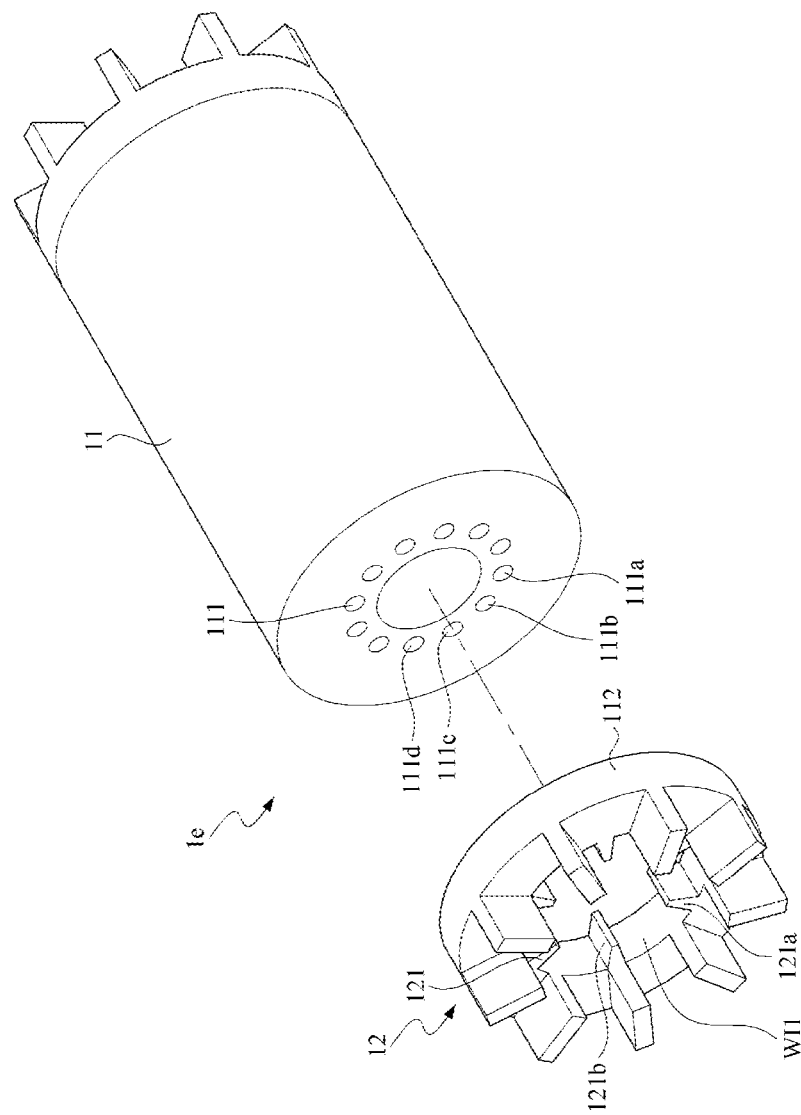
FIG. 11 is a schematic exploded view of a sixth embodiment of the rotor with a pressure-deviation generating assembly in accordance with the present invention.
Figure 12:
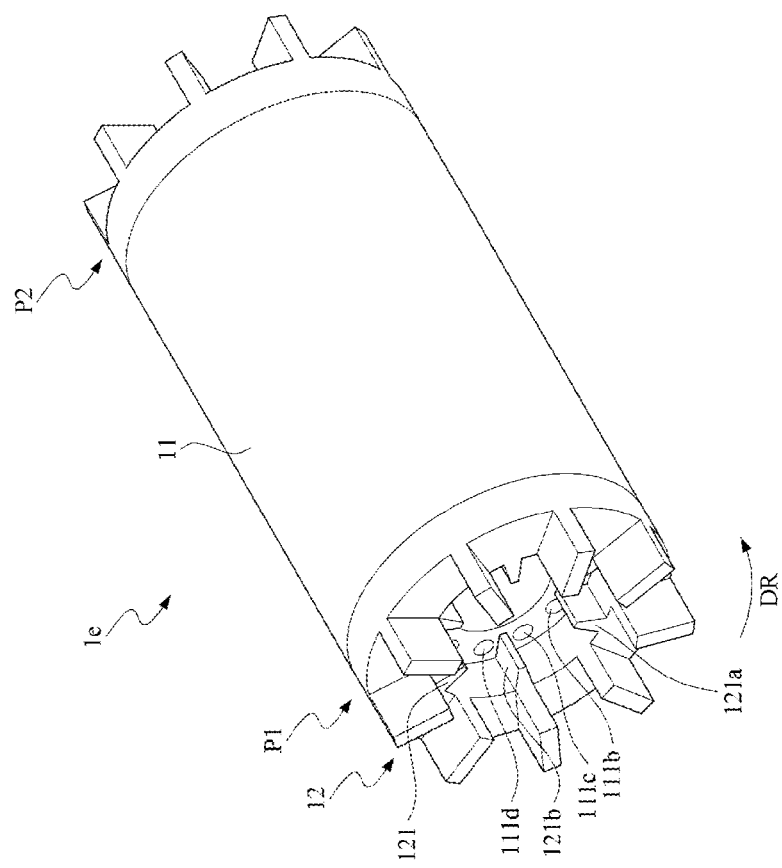
FIG. 12 is a schematic perspective view of FIG. 11.
Figure 13:
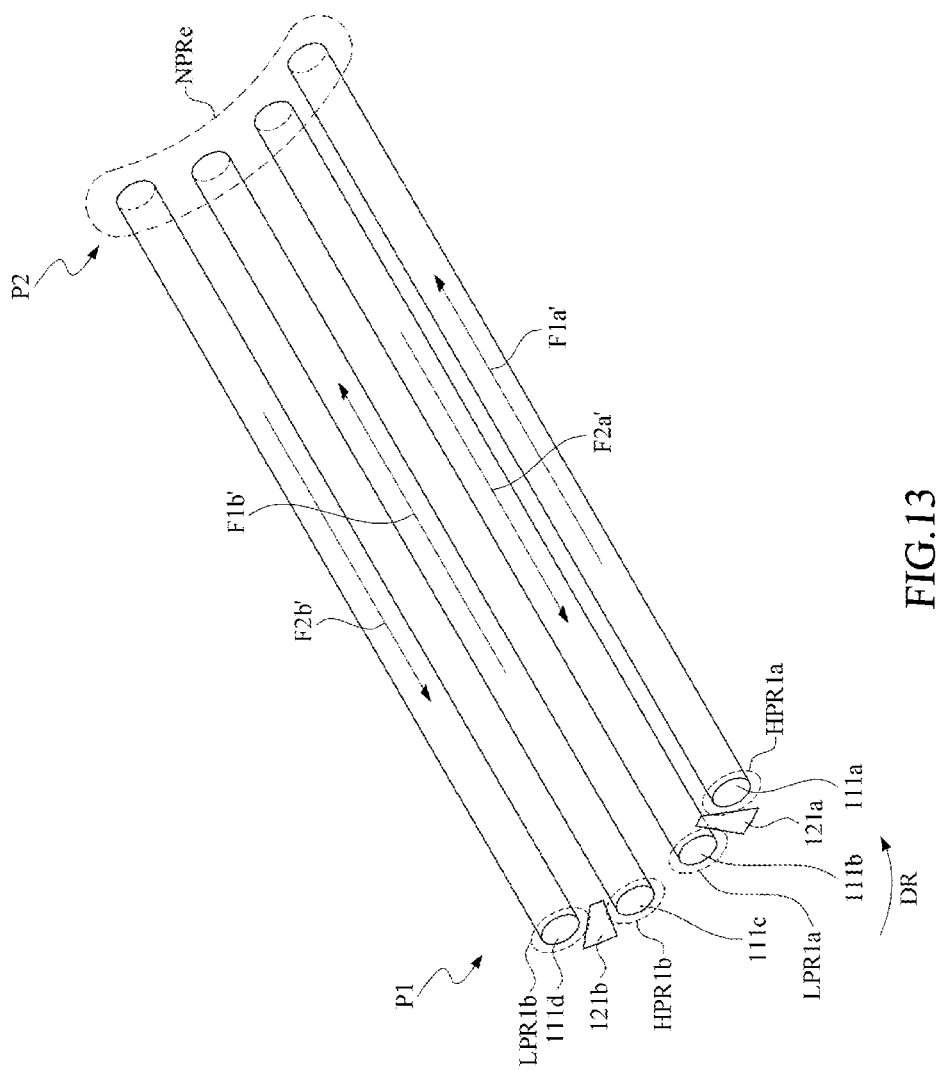
FIG. 13 demonstrates schematically a flow pattern provided by the sixth embodiment of the rotor with a pressure-deviation generating assembly in accordance with the present invention.

Then, refer to FIG. 11 through FIG. 13; where FIG. 11 is a schematic exploded view of a sixth embodiment of the rotor with a pressure-deviation generating assembly in accordance with the present invention, FIG. 12 is a schematic perspective view of FIG. 11, and FIG. 13 demonstrates schematically a flow pattern provided by the sixth embodiment of the rotor with a pressure-deviation generating assembly in accordance with the present invention. As shown, the rotor with a pressure-deviation generating assembly 1e includes a main body 11 and a first pressure-deviation generating assembly 12.

The main body 11, extending from a first end portion P1 to a second end portion P2, is furnished with a plurality of tunnels 111 extending in parallel from the first end portion P1 to the second end portion P2. The first end portion P1 has a first interior wall WI1. Further, in detail, the main body 11 has a first main end ring 112 at the first end portion P1, and the first main end ring 112 also has the first interior wall WI1.

The first pressure-deviation generating assembly 12, coupling with the first interior wall WI1, includes a plurality of first pressure-deviation generating fins 121. It shall be explained that, in the following description, though labels 121, 121a and 12ab are all for the first pressure-deviation generating fins, yet labels 121a and 121b for the first pressure-deviation generating fins in the figure are only used for conveniently elucidating this embodiment, and label 121 is the general part number for every of the first pressure-deviation generating fins in the description of this disclosure. In this embodiment, the first pressure-deviation generating assembly 12 are integrated with the first interior wall WI1 as, but not limited to, a unique piece. In the second embodiment, the third embodiment, the fourth embodiment, the fifth embodiment or some other embodiments, the fasteners, the buckling structures or the buckling grooves can be used to connect the first pressure-difference generating assembly 12 with the main body. In addition, the number of the tunnels 111 is equal to, but not limited to, twice the number of the first pressure-deviation generating fins 121. In some other embodiments of the present invention, the number of tunnels 111 can be also equal to triple, four times, or other integer multiple the number of the first pressure-deviation generating fins 121.

Further, in detail, referring to FIG. 12 and FIG. 13, while the rotor with a pressure-deviation generating assembly 1e rotates in a direction of rotation DR, since the second end portion P2 does not have any component or structure to produce a pressure deviation, thus a normal-pressure region NPRe can be kept. In addition, the first end portion P1 would also present a normal-pressure region, while the rotor with a pressure-deviation generating assembly 1e is stationary.

While the rotor with a pressure-deviation generating assembly 1e rotates, the first pressure-deviation generating fin 121a would generate a first high-pressure region HPR1a greater in pressure than the normal-pressure region NPRe and a first low-pressure region LPR1a smaller in pressure than the normal-pressure region NPRe. The first pressure-deviation generating fin 121b would generate a first high-pressure region HPR1b and a first low-pressure region LPR1b. The first high-pressure region HPR1a and the first high-pressure region HPR1b are disposed to the first tunnels 111a and 111c of the tunnels 111, respectively; and, the first low-pressure region LPR1a and the first low-pressure region LPR1b are individually disposed to the second tunnels 111b and 111d of the tunnels 111, respectively.

Since the air flow flows automatically from a high-pressure region to a low-pressure region, and further the pressure within the first high-pressure region HPR1a or the first high-pressure region HPR1b is greater than that within the normal-pressure region NPRe, thus the first flows F1a' and F1b' would be automatically generated to flow from the first end portion P1 to the second end portion P2. On the other hand, since the pressure within the first low-pressure region LPR1a or the first low-pressure region LPR1b is smaller than that within the normal-pressure region NPRe, thus the second flows F2a' and F2b' would be automatically generated to flow from the second end portion P2 to the first end portion P1. However, though, in this embodiment, the first pressure-deviation generating assembly 12 can only provide a pressure deviation less than the pressure deviation generated in the first embodiment, yet even such a minor pressure deviation over the normal pressure, the bi-directional air flow pattern can be still built for the tunnels 111, such that the object of promoting heat dissipation can be obtained.

In summary, the rotor with a pressure-deviation generating assembly provided by the present invention can generate a pressure deviation between the first end portion and the second end portion, and thus the bi-directional air flow pattern inside the tunnels 111 can be built to promote the heat dissipation of the rotor.

While the present invention has been particularly shown and described with reference to a preferred embodiment, it will be understood by those skilled in the art that various changes in form and detail may be without departing from the spirit and scope of the present invention.

What is claimed is:

1. A rotor, comprising:
   a main body, extending from a first end portion to a second end portion, furnished with a plurality of tunnels extending from the first end portion to the second end portion;
   a first pressure-deviation generating assembly, having a first interior wall, including a plurality of first pressure-deviation generating fins positioned in correspondence to the plurality of tunnels at the first end portion, each of the plurality of first pressure-deviation generating fins extending from the first interior wall toward a rotor shaft; wherein, when the main body rotates, a first high-pressure region higher in pressure than a normal-pressure region is generated at a first pressure-increased side of each of the plurality of first pressure-deviation generating fins, and a first low-pressure region lower in pressure than the normal-pressure region is generated at a first pressure-reduced side of each of the plurality of first pressure-deviation generating fins; and
   a second pressure-deviation generating assembly, having a second interior wall, including a plurality of second pressure-deviation generating fins positioned in correspondence to the plurality of tunnels at the second end portion, each of the plurality of second pressure-deviation generating fins extending from the second interior wall toward the rotor shaft; wherein, when the main body rotates, a second high-pressure region higher in pressure than the normal-pressure region is generated at a second pressure-increased side of each of the plurality of second pressure-deviation generating fins and located respective to the first low-pressure region, and a second low-pressure region lower in pressure than the normal-pressure region is generated at a second pressure-reduced side of each of the plurality of second pressure-deviation generating fins and located respective to the first high-pressure region;
   wherein the first high-pressure region and the second low-pressure region are disposed in correspondence to at least one first tunnel out of the plurality of tunnels, and the first low-pressure region and the second high-pressure region are disposed in correspondence to at least one second tunnel out of the plurality of tunnels, such that at least one first flow is generated to flow from the first high-pressure region to the second low-pressure region via the at least one first tunnel, and at least one second flow is generated to flow from the second high-pressure region to the first low-pressure region via the at least one second tunnel;
   wherein each of the plurality of first pressure-deviation generating fins extends from the first interior wall toward the rotor shaft by a first extension length, each of the plurality of tunnels has an aperture size, and the first extension length is larger than the aperture size.

2. The rotor of claim 1, wherein the first pressure-deviation generating assembly and the main body are integrated as a unique piece.

3. The rotor of claim 1, wherein the first pressure-deviation generating assembly is fixed to the main body by at least one fastener.

4. The rotor with a pressure-deviation generating assembly of claim 1, wherein the first pressure-deviation generating assembly is fixed to the main body by at least one buckling structure.

5. The rotor of claim 1, wherein a number of the plurality of tunnels is equal to at least twice a number of the plurality of first pressure-deviation generating fins.

6. The rotor of claim 1, wherein the plurality of tunnels is arranged in a circular form with an identical interval, the plurality of first pressure-deviation generating fins is arranged respective to the plurality of tunnels with another identical interval, the plurality of second pressure-deviation generating fin is arranged at the second end portion in a misalignment manner respective to the plurality of first pressure-deviation generating fins, and the plurality of second pressure-deviation generating fins is arranged with a further identical interval.

7. The rotor of claim 1, wherein a number of the plurality of second pressure-deviation generating fins is equal to that of the plurality of first pressure-deviation generating fins.

8. The rotor of claim 1, wherein the first pressure-deviation generating assembly further includes a first end ring, and one side of the first end ring is coupled with the first interior wall, while another side thereof is coupled with the plurality of first pressure-deviation generating fins.

9. The rotor of claim 8, wherein the second pressure-deviation generating assembly further includes a second end ring, and one side of the second end ring is coupled with the second interior wall, while another side thereof is coupled with the plurality of second pressure-deviation generating fins.

10. The rotor of claim 1, wherein each of the plurality of second pressure-deviation generating fins extends from the second interior wall toward the rotor shaft by a second extension length larger than the aperture size.

11. The rotor of claim 10, wherein the second extension length is equal to the first extension length.

12. A rotor, comprising:
    a main body, extending from a first end portion to a second end portion, furnished with a plurality of tunnels extending from the first end portion to the second end portion; and
    a first pressure-deviation generating assembly, having a first interior wall, including a plurality of first pressure-deviation generating fins positioned in correspondence to the plurality of tunnels at the first end portion, each of the plurality of first pressure-deviation generating fins extending from the first interior wall toward a rotor shaft; wherein, when the main body rotates, a first high-pressure region higher in pressure than a normal-pressure region is generated at a first pressure-increased side of each of the plurality of first pressure-deviation generating fins, and a first low-pressure region lower in pressure than the normal-pressure region is generated at a first pressure-reduced side of each of the plurality of first pressure-deviation generating fins;
    wherein the first high-pressure region is disposed in correspondence to at least one first tunnel out of the plurality of tunnels, and the first low-pressure region is disposed in correspondence to at least one second tunnel out of the plurality of tunnels, such that at least one first flow is generated to flow from the first high-pressure region to the second end portion via the at least one first tunnel, and at least one second flow is generated to flow from the second end portion to the first low-pressure region via the at least one second tunnel;
    wherein each of the plurality of first pressure-deviation generating fins extends from the first interior wall toward the rotor shaft by a first extension length, each of the plurality of tunnels has an aperture size, and the first extension length is larger than the aperture size.

13. The rotor of claim 12, wherein the first pressure-deviation generating assembly and the main body are integrated as a unique piece.

14. The rotor of claim 12, wherein the first pressure-deviation generating assembly is fixed to the main body by at least one fastener.

15. The rotor of claim 12, wherein the first pressure-deviation generating assembly is fixed to the main body by at least one buckling structure.

16. The rotor of claim 12, wherein a number of the plurality of tunnels is equal to twice a number of the plurality of first pressure-deviation generating fins.

17. The rotor of claim 12, wherein the plurality of tunnels is arranged in a circular form with an identical interval, the plurality of first pressure-deviation generating fins is arranged respective to the plurality of tunnels with another identical interval.

18. The rotor of claim 12, wherein the first pressure-deviation generating assembly further includes a first end ring, and one side of the first end ring is coupled with the first interior wall, while another side thereof is coupled with the plurality of first pressure-deviation generating fins.

\* \* \* \* \*